UNITED STATES PATENT OFFICE 2,480,439

METHOD OF FORMING SUBSTITUTED ALPHA-AMINO ACID AMIDES

Frederick C. Bersworth, Verona, N. J.

No Drawing. Application April 14, 1947,
Serial No. 741,408

4 Claims. (Cl. 260—561)

This invention relates to chemistry and more particularly to organic chemistry, and has for its object the provision of a method of producing substituted alpha amino acid amides.

Another purpose is to provide a method for converting 2,5 di-keto piperazine into substituted glycine amides.

Another purpose is to provide substituted alpha amino acid amides which are of particular utility in the art as reactive extenders and modifiers for use with natural and artificial rubber, as compounds useful for further organic synthesis and in the formation of long chain high molecular weight amino compounds, and in other fields.

Other purposes will be apparent as the invention is more fully hereinafter disclosed.

This application is a continuation-in-part of my prior application Serial No. 485,344 filed May 1, 1943, now abandoned, which was a continuation-in-part of application Serial No. 363,109 filed October 24, 1940, now issued as U. S. Patent No. 2,318,046 dated May 4, 1943.

In accordance with the above purposes, I have discovered that when 2,5 di-keto piperazine is heated in the presence of an aliphatic amine which contains at least one amino group bound to a carbon atom of the aliphatic group contained therein, the amino group containing at least one displaceable hydrogen, under conditions excluding atmospheric gases, the peptide linkage between adjacent amino acid residues is broken with the resultant formation of a substituted alpha amino acid amide, the carboxyl group of which has been amidated and the amino group of which has been replaced by the amine used. The reaction involved in the present invention may most simply be illustrated by indicating the sequence of reactions involved in practicing the invention with a secondary aliphatic amine.

When 2,5 di-keto piperazine is heated, in the absence of atmospheric gases, in the presence of an aliphatic amine conforming to the following formula:

RNHR₁ where R represents an aliphatic group and R₁ represents hydrogen or an alkyl group therefor, the reaction proceeds as follows:

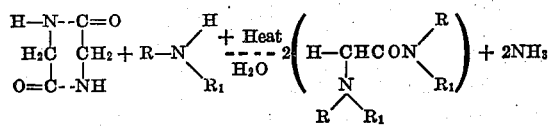

The temperature of the reaction varies widely depending on the temperature at which a substantially liquid phase may be obtained between the 2,5 di-keto piperazine and the amine. In general, it is preferred to operate at a temperature at which any water present is partly in the vapor phase, that is, above 100° C., but at a temperature below 200° C. Most of the amines exist in the liquid phase at some temperature within this range and those amines that normally exist in the vapor phase under these conditions, are reacted with the 2,5 di-keto piperazine under pressure in a closed system, preventing the escape of the amine from the reaction chamber.

Where a primary aliphatic amine (RNH₂) is employed in place of the secondary amine indicated in the above reaction, in addition to the normal product described above, a di-substituted amide is formed conforming to the following structure:

where R represents an aliphatic group.

When a polyamine containing at least two amino groups attached directly to a carbon atom of an aliphatic group, at least one of which contains a displaceable amino hydrogen, a mono- to poly-substituted amine is produced depending on the number of displaceable amino hydrogens present in the amine and the extent to which the substitution is carried. With a diamine, for example, conforming to the formula:

(where n equals at least two) the tetra-substituted diamine conforming to the following structure may be obtained as well as the mono-, di- and tri-substituted compound:

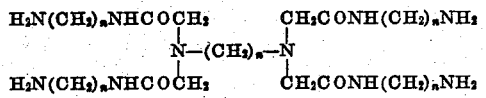

This tetra-substituted diamine contains four unreacted amino groups available for further synthesis reaction and where n is a number as large as four or five, the compound is of high molecular weight, particularly adapting the same for use as a reactive plasticizer and extender in natural and artificial rubber.

As a specific example of the present invention but not as a limitation thereof, the invention will be described as practiced in the formation of the substituted alpha amino acid amides derived from 2,5 di-keto piperazine and various aliphatic amines.

*Example 1.*—500 grams of the 2,5 di-keto piperazine are heated in a container closed to the atmosphere but provided with a pressure release valve venting the gases evolved within the container at a pressure of 75 pounds per square inch to the atmosphere in the presence of a large excess (2,000 grams) of an aqueous solution of di-n-propylamine containing 40% water, to a temperature above 100° C. but not over 135° C. Water seems to affect the rate of reaction. A small amount of water may be introduced with the amine in the form of residual water present or alternatively where a relatively rapid rate of reaction is desired; the amine water solution may contain as high as 40% water. Heating of the 2,5 di-keto piperazine and the amine is continued until a constant pressure is obtained within the container, indicating that no further reaction with resultant evolution of ammonia between the compounds is occuring. The residual water and ammonia and the excess amine is then removed from the reaction mixture by volatilization and distillation, preferably under reduced pressure and the reaction product remaining is cooled to room temperature. Di-n-propylamine, under these conditions, reacts with 2,5 di-keto piperazine to form the compound:

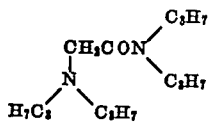

*Example 2.*—When amylamine $(C_5H_{11})NH_2$ is similarly heated in 50% or more excess with 2,5 di-keto piperazine to temperatures around 100° C. a similar reaction takes place to form the di-substituted compound:

The product is a highly viscous liquid having a typical nitrogen-compound color.

*Example 3.*—When the 2,5 di-keto piperazine is similarly heated with at least a 50% excess of ethylene diamine to temperatures within the range 100–116° C. reaction will take place as described in the above examples to form first, the di-substituted product:

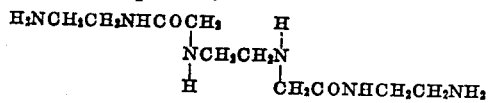

On further heating with excess diamine, 2,5 di-keto piperazine may be converted to the tetra-substituted compound. The displacement of the second amino hydrogens is more difficult, however; as the number of methylene groups $(CH_2)$ of the aliphatic diamine increases with resultant greater spacing between the amino nitrogens, the formation of the tetra-substituted compound becomes easier although still difficult to obtain in one operation. In general, as long as there is excess diamine present, the free amino groups of the above compound will remain unreacted. In the absence of excess diamine, these free amino groups may be reacted by displacement of the amino hydrogens to form more complex substituent groups as one skilled in the art can easily recognize.

It is believed apparent from the above description that many modifications and departures may be made in the present invention without essential departure therefrom and all such are contemplated as may fall within the scope of the following claims:

What I claim is:

1. The method of producing a substituted alpha amino acid amide which comprises heating a reaction mixture consisting of 2,5 di-keto piperazine, water and a member of the group consisting of primary and secondary alkyl amines, and alkylene polyamines to a reaction temperature within the range 100–200° C. at which gaseous ammonia is evolved from the heated reaction mixture while maintaining over said heated reaction mixture a determined positive pressure of said gaseous ammonia at least sufficient to exclude atmospheric gases from the heated reaction mixture for an extended time interval required to complete the evolution of gaseous ammonia from said reaction solution and then removing the water and unreacted amine from the reaction mixture to recover therefrom the alpha amino acid amide reaction product, the amount of said amine in said mixture being in large excess of that theoretically required to react with the amount of the 2,5 di-keto piperazine present therein, and the amount of said water in the reaction mixture being from small substantially residual amounts up to about 40% by weight of the amine present in the said reaction mixture.

2. The method of producing a substituted alpha amino acid amide which comprises heating a reaction mixture consisting of 2,5 di-keto piperazine, di-n-propylamine and water and containing about 4 parts (by weight) of a 60% aqueous solution of the amine for each part of di-keto piperazine, to a reaction temperature above 100° C. but not over 135° C. at which gaseous ammonia evolves from the reaction mixture, under a maintained positive pressure of said gaseous ammonia approximating 75 pounds per square inch, for an extended time interval required to complete the evolution of ammonia from the heated reaction mixture, then distilling off the water and unreacted amine from the reaction mixture to recover therefrom the substituted alpha amino acid amide reaction product present therein.

3. The method of producing a substituted alpha amino acid amide which comprises heating a reaction mixture consisting of 2,5 di-keto piperazine, ethylene diamine and water, the amount of said diamine being at least in 50% excess of that theoretically required to completely react with the amount of the di-keto piperazine and the amount of the water being at least a small amount and up to 40% of the weight of the diamine, to a reaction temperature of 100–116° C. at which gaseous ammonia evolves from the reaction mixture, under a maintained positive pressure of said gaseous ammonia at least sufficient to exclude atmospheric gases from the heated reaction mixture, and for a time interval required to complete the evolution of gaseous ammonia from the reaction mixture, then distilling off the water and unreacted amine from the reaction mixture to recover the substituted alpha amino acid amide reaction product therein.

4. The method of producing a substituted alpha amino acid amide which comprises heating a reaction mixture consisting of 2,5 di-keto piperazine, amylamine and water and containing an amount of amylamine at least approximating a 50% excess of that theoretically required to react completely with the di-keto piperazine and an amount of water ranging from small amounts up to 40% of the weight of the amylamine, to a temperature approximately 100° C. at which gaseous ammonia evolves from the heated reaction mixture, under a maintained positive pressure of said gaseous ammonia at least sufficient to exclude atmospheric gases from the heated reaction mixture, for a time interval required to complete the evolution of gaseous ammonia from the reaction mixture, then subjecting the reaction mixture to distillation to remove therefrom the water and excess amylamine present therein to recover therefrom the substituted amino acid amide reaction product.

FREDERICK C. BERSWORTH.

REFERENCES CITED

The following references are of record in the file of this patent:

UNITED STATES PATENTS

| Number | Name | Date |
|---|---|---|
| 2,406,186 | Baldwin et al. | Aug. 20, 1946 |